US010880464B1

(12) United States Patent
Kim et al.

(10) Patent No.: US 10,880,464 B1
(45) Date of Patent: Dec. 29, 2020

(54) REMOTE ACTIVE CAMERA AND METHOD OF CONTROLLING SAME

(71) Applicant: AGENCY FOR DEFENSE DEVELOPMENT, Daejeon (KR)

(72) Inventors: Daeyeon Kim, Daejeon (KR); Eunjin Koh, Daejeon (KR); Jaekyu Lee, Daejeon (KR); Junghyun Park, Daejeon (KR); Jaewan Lim, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 16/709,017

(22) Filed: Dec. 10, 2019

(30) Foreign Application Priority Data

Aug. 9, 2019 (KR) .................. 10-2019-0097715

(51) Int. Cl.
H04N 5/232 (2006.01)
G06T 7/70 (2017.01)
G06T 7/20 (2017.01)

(52) U.S. Cl.
CPC .......... *H04N 5/23203* (2013.01); *G06T 7/20* (2013.01); *G06T 7/70* (2017.01); *H04N 5/23299* (2018.08)

(58) Field of Classification Search
None
See application file for complete search history.

(56) References Cited

U.S. PATENT DOCUMENTS

2008/0267451 A1\* 10/2008 Karazi ............... G06K 9/00771
382/103
2015/0110345 A1\* 4/2015 Weichselbaum ...... G01S 3/7864
382/103

FOREIGN PATENT DOCUMENTS

| KR | 10-2004-0055430 A | 6/2004 |
| KR | 10-2013-0066909 A | 6/2013 |
| KR | 10-2015-0106241 A | 9/2015 |
| KR | 10-1738519 B1 | 6/2017 |
| KR | 10-2018-0041354 A | 4/2018 |
| KR | 10-2018-0130643 A | 12/2018 |

OTHER PUBLICATIONS

Koh, Eunjin et al., "Gimbal Tracking Control with Delayed Feedback of Target Information", Journal of Electrical & Technology (Apr. 15, 2019), vol. 14, pp. 1723-1731 (partial contents of present application published).

\* cited by examiner

*Primary Examiner* — Clifford Hilaire
(74) *Attorney, Agent, or Firm* — Scully Scott Murphy and Presser

(57) ABSTRACT

Provided is a remote active camera including an image capture unit; a gimbal unit that changes a direction in which the image capture unit is directed; a memory in which images having an identification number are stored; a communication unit that transmits acquired images to a remote control apparatus and receives target designation information from the remote control apparatus; a tracking unit that includes a first tracking unit which tracks a position of a preset reference target from a first image, and a second tracking unit which tracks positions of the designation target and the reference target from a second image; and a controller that compares identification numbers of the first and second images, estimates or detects a position value of the designation target on the basis of positions of the designation target and the reference target, and a position of the reference target, and controls the gimbal unit.

12 Claims, 8 Drawing Sheets

REMOTE ACTIVE CAMERA AND METHOD OF CONTROLLING SAME

CROSS-REFERENCE TO RELATED APPLICATION

Pursuant to 35 U.S.C. § 119(a), this application claims the benefit of the earlier filing date and the right of priority to Korean Patent Application No. 10-2019-0097715, filed on Aug. 9, 2019, the contents of which is incorporated by reference herein in its entirety.

BACKGROUND

1. Technical Field

The present disclosure relates to a remote active camera and a method of controlling the remote active camera for controlling a gimbal of a camera in order to track a target in a system for remotely controlling a camera tracking the target.

2. Description of the Related Art

In recent years, technologies such as a wireless sensor and actor networks (WSAN) have been introduced in order to detect a signal that is transmitted over a network from an apparatus which is a distance away, to deal with an abnormal situation through remote driving, and to effectively acquire information. Applications include an image monitoring apparatus (hereinafter referred to as a remotely-driven camera or a remote active camera).

A process of operating the image monitoring apparatus is as follows. First, an image that is acquired from a remote active camera (RAC) is transferred to an operator that is remotely located, over a network. When the operator specifies an object of interest (hereinafter referred to as a target) on the basis of the received image, a remote control unit calculates control information on the basis of the specified target and transmits the calculated control information to the remote active camera over a network. Then, the remote active camera controls a direction in which the camera is directed toward the target, according to the received control information, and provides more effective target monitoring to the operator. The remote control unit may be mounted not only on a fixed platform, but also on a movable object, such as a drone.

However, in a case where an information transfer delay occurs between the remote motive camera and the operator, it difficult to transmit an image sensed in the remote motive camera and it is also difficult to transmit the control information calculated in the remote active unit to the remote active camera.

In this case, the immediacy of the control of the remote active camera is reduced. If the immediacy of the remote control is not ensured, in some cases, the target is out of the field of view. Furthermore, a problem due to a delay in information transfer is more likely to occur when the remote active camera is mounted on a movable platform than when the remote active camera is mounted on the fixed platform.

SUMMARY

An object of the present disclosure is to provide a remote active camera and a method of controlling the remote active camera that are capable of performing target tracking and controlling a gimbal of a camera to minimize an influence due to a communication delay and to deal with the communication delay in effectively controlling the remote active camera.

Another object of the present disclosure is to provide a remote active camera and a method of controlling the remote active camera that are capable of compensating for a time delay between a point in time at which target identification information is received from an operator and a point in time at which a current image is received, and thus tacking a target.

According to an aspect of the present disclosure, there is provided a remote active camera including: an image capture unit that captures an image; a gimbal unit that changes a direction in which the image capture unit is directed; a memory in which images having an identification number that increases sequentially according to an acquired time sequence are stored; a communication unit that transmits acquired images to a remote control apparatus and receives target designation information including an image identification number of an image from which a designation target is set and pixel coordinates of the designation target, from the remote control apparatus; a tracking unit that includes a first tracking unit which tracks a position of a preset reference target from a first image having the greatest identification number, of the images stored in the memory, and a second tracking unit which tracks positions of the designation target and the reference target from a second image that is one image that is among images between a point in time at which an image corresponds to the image identification number and a point in time at which the first image is acquired; and a controller that compares an identification number of the second image and an identification number of the first image, estimates a position value of the designation target with respect to the first image or detects the position value of the designation target with respect to the first image, on the basis of a position of the designation target and a position of the reference target, which are tracked from the second image, and a position of the reference target, which is tracked from the first image, according to a result of the comparison, and controls the gimbal unit in such a manner that a direction in which the image capture unit is directed is changed according to the position value of the designation target, which is estimated or detected.

In the remote active camera, when estimating or detecting the position value of the designation target, the controller may add a preset value to the identification number of the second image and detects an image corresponding to the identification number to which the preset value is added, also as the second image, and the preset value may be a value that is greater than a number by which the identification number of the first image, which is compared with the identification number of the second image, increases.

In the remote active method, as a result of comparing the identification number of the second image and the identification number of the first image, in a case where the identification number of the second image is smaller than the identification number of the first image, the controller may estimate the position value of the designation target with respect to the first image, on the basis of both a result of the tracking by the first tracking unit and a result of the tracking by the second tracking unit, and, in a case where the identification number of the second image is greater than the identification number of the first image, the controller may detect the position value of the designation target with respect to the first image from one result of the tracking by the first tracking unit.

In the remote active method, in a case where the identification number of the second image is greater than the identification number of the first image, the controller may drive the second tracking unit in a low power mode.

In the remote active camera, in a case where the position value of the designation target with respect to the first image is estimated, the controller may cause a weighting factor in accordance with a preset weighted-sum function according to the following equation 4 or 5 to be reflected in the estimated position value, and may control the gimbal unit on the basis of the estimated position value of the designation target, in which the weighting factor is reflected, in such a manner that the speed at which the direction in which the image capture unit is directed is changed is limited.

$$f(u, v, w) = wu + (1 - w)v \quad \text{Equation 4}$$

$$P_t^* = f(c'_{t_b,t}, P'_{b,t}, w_t) \quad \text{Equation 5}$$

where $P^*_t$ is the estimated position value of the designation target, in which the weighting factor is reflected, $C'_{t_b,t}$ is an estimation value of a position to which the center of an image ($t_b$) acquired at a point in time at which the designation target is designated is moved from the first image (t), $P'_{b,t}$ is the estimated position value of the designation target, and $w_t$ is the weighting factor that increases with time.

In the remote active camera, the weighting factor $w_t$ may have a value from 0 to 1.

In the remote active camera, the reference target may be a target that is tracked earlier than the designation target and may be a target that is trackable only with the position value detected from the first image through the first tracking unit.

In the remote active camera, in a case where the reference target is not present, when the target designation information is received, the controller may set the center of an image having the greatest identification number, of the images stored in the memory, to be the reference target.

According to another aspect of the present disclosure, there is provided a remote active camera control system including: a remote active camera that, when target designation information including an image identification number of an image from which a designation target is set and pixel coordinates of the designation target are received, drives at least one of two tracking units, detects at least one of positions of a preset reference target and the designation target, from at least one of a first image having the greatest identification number, of currently-stored images and a second image that is one image that is among images between a point in time at which an image corresponds to the image identification number and a point in time at which the first image is acquired; and autonomously tracks a position of the designation target on the first image; and a remote control apparatus that, when the designation target is set with respect to at least one of images that are transmitted from the remote active camera, transmits the image identification number and the pixel coordinates, as the target designation information, and receives an image in accordance with a result of tracking the position of the designation target, as a response to the transmitted target designation information, from the remote active camera.

According to still another aspect of the present disclosure, there is a method of controlling a remote active camera, including: a first step of receiving a target designation information including an image identification number of an image from which a designation target is set, and pixel coordinates of the designation target, from a remote control apparatus; a second step of detecting an arbitrary image between a point in time at which an image corresponding to the image identification number is acquired and a point in time at which a first image having the greatest identification number, of images stored in a memory, is acquired, as a second image; a third step of comparing an identification number of the second image and an identification number of the first image; a fourth step of detecting a position of the designation target and a position of a reference target, which are tracked from the second image, and a reference target that is tracked from the first image, when the identification number of the second image is smaller than the identification number of the first image, as a result of the comparison in the third step; a fifth step of estimating a position value of the designation target with respect to the first image, on the basis of the detected positions; a sixth step of performing directional control in such a manner that a central position of an image that is captured is changed according to the estimated position value of the designation target; a seventh step of adding a preset value to the identification number of the second image, detecting an image corresponding to the identification number to which the preset value is added, also as the second image, and detecting the first image having the greatest identification number, of images stored in a memory; and an eighth step of comparing the identification number of the second image and the identification number of the first image, which are detected in the seventh step, and repeatedly performing the fourth step to the seventh step according to a result of the comparison.

In the method, the preset value may be a value that is greater than a number by which the identification number of the first image increases each time the seventh step is performed.

In the method the fourth step may include a (4-1)-th step of detecting a position value of the designation target from the first image in a case where the identification number of the second image is greater than the identification number of the first image, as a result of the comparison in the third step; and a (4-2)-th step of performing directional control in such a manner that a central position of an image that is captured is changed according to the detected position value of the designation target.

In the method, in the sixth step, a weighting factor in accordance with a preset weighted-sum function according to Equation 4 or 5 may be caused to be reflected in the estimated position value of the designation target, and the directional control may be performed on the basis of the estimated position value of the designation target, in which the weighting factor is reflected, in such a manner that a speed at which the central position is changed is limited.

$$f(u, v, w) = wu + (1 - w)v \quad \text{Equation 4}$$

$$P_t^* = f(c'_{t_b,t}, P'_{b,t}, w_t) \quad \text{Equation 5}$$

where $P^*_t$ is the estimated position value of the designation target, in which the weighting factor is reflected, $C'_{t_b,t}$ is an estimation value of a position to which the center of an image ($t_b$) acquired at a point in time at which the designation target is designated is moved from the first image (t), $P'_{b,t}$ is the estimated position value of the designation target, and $w_t$ is the weighting factor that increases with time.

In the remote active camera, the weighting factor $w_t$ may have a value from 0 to 1.

DETAILED DESCRIPTION OF THE EMBODIMENTS

Notably, technical terms used in the present specification are only for describing specific embodiments and are not intended to impose any limitation on the scope of the present disclosure. In addition, the term used in the present specification, although expressed in the singular, is construed to have a plural meaning, unless otherwise meant in context. The phrase "is configured with," "include," or the like, which is used in the present specification, should not be construed as being used to necessarily include all constituent elements or all steps that are described in the specification, and should be construed in such a manner that, among all the constituent elements or among all the steps, one or several constituent elements or one or several steps, respectively, may not be included, or that one or several other constituent elements, or one or several other steps may be further included.

In addition, in a case where it is determined that a detailed description of the well-known technology in the relevant art to which the present disclosure pertains makes indefinite the nature and gist of the technology disclosed in the present disclosure, the detail description thereof is omitted from the present specification.

Figure 1:
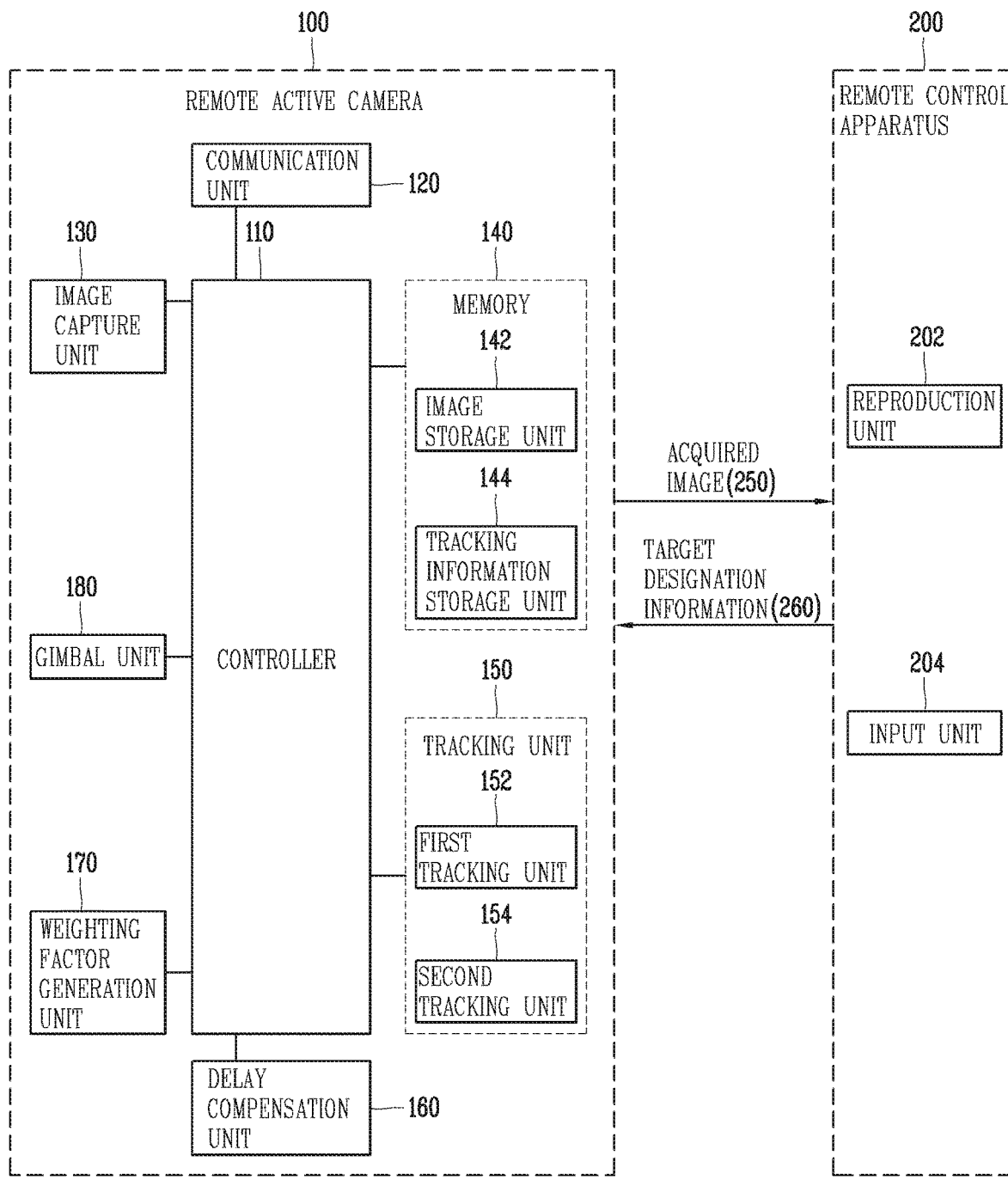
FIG. 1 is a block diagram illustrating configurations of a remote active camera according to an embodiment of the present disclosure and a remote control apparatus.

First, FIG. 1 is a block diagram illustrating configurations of a remote active camera 100 according to an embodiment of the present disclosure and a remote control apparatus 200.

With reference to FIG. 1, the remote active camera 100 according to the embodiment of the present disclosure is connected to the remote control apparatus 200 through a network. Then, the remote active camera 100 is controlled through the remote control apparatus 200 and transmits a captured image through the network at the request of the remote control apparatus 200.

Then, in a case where a target is designated from the transmitted image by the remote control apparatus 200, target designation information 260 on the designated target is transmitted from the remote control apparatus 200 to the remote active camera 100. Then, the remote active camera 100 tracks the target on the basis of the received target designation information 260 and transmits an image of the tracked target to the remote control apparatus 200. The target designation information 260 here includes pixel coordinates of the target within the image and an identification number of an image from which the target is designated.

When receiving the target designation information 260, the remote active camera 100 sets a new target or makes a change from the existing tracked target to a target in accordance with the target designation information 260, and then performs tracking. A result of tracking the designated target is generated, as line-of-sight error information, from the remote active camera 100, and a line-of-sight change rate is calculated according to the result of the tracking. The calculated line-of-sight change rate is used to drive a gimbal unit 180 and thus an angle at which the remote active camera 100 is directed is determined. As a result, an angle of an acquisition image is decided.

To this end, the remote active camera 100 according to the embodiment of the present disclosure identifies a target (hereinafter referred to as a designation target) that is designated from an image that corresponds to image identification information included in the received target designation information 260. Then, a target corresponding to the target designation information is tracked from images that are acquired during a duration from a point in time at which an image corresponds to the image identification information to a point in time at which the current image is acquired, and a gimbal of a camera is controlled according to a result of the tracking. As a result, a direction in which a lens of the camera is directed is controlled. That is, according to the present disclosure, by receiving only information associated with target designation (the target designation information 260) from the remote control apparatus 200, a remote active camera autonomously tracks a target and controls a gimbal. Thus, an amount of data that is transmitted from the remote control apparatus 200 is minimized. Accordingly, a transmission delay, that is, a delay time taken for transfer of information that is transmitted from the remote control apparatus 200 is minimized.

In this manner, according to the present disclosure, the remote active camera 100 autonomously tracks a target according to the target designation information 260. In addition, in order to compensate for a time delay that occurs while the target designation information 260 is received, a tracking process of tracking the designation target from an image corresponding to the image identification information in the target designation information 260 and a currently-acquired image is performed at the same time.

The remote active camera 100 according to the embodiment of the present disclosure is configured to include a controller 110, a communication unit 120 that is connected to the controller 110 and is controlled by the controller 110, an image capture unit 130, a memory 140, a tracking unit 150, a delay compensation unit 160, a weighing factor generation unit 170, and the gimbal unit 180.

First, the communication unit 120 includes at least one module for performing wireless communication with the remote control apparatus 200. The communication unit 120 receives a control signal from the remote control apparatus 200 through at least such one module and transfers an acquired image to the remote control apparatus 200 under the control of the controller 110. In addition, the target designation information 260 is received from the remote control apparatus 200.

The image capture unit 130 includes at least one image sensor for acquiring an image. Then, an image is acquired under the control of the controller 110, and the acquired image is stored in the memory 140 under the control of the controller 110.

On the other hand, various pieces of data and various pieces of information for operation of the remote active camera 100 are stored in the memory 140. Then, an image that is acquired in the image capture unit 130 is stored in the memory 140. The acquired images have their respective pieces of unique identification information, and the pieces of identification information correspond to points of time, respectively, at which the images are acquired. In addition, target designation information that is received from the remote control apparatus 200 is stored in the memory 140, and pieces of tracking information that are detected from at least one image according to the target designation information are stored in the memory 140. A storage area of the memory 140, in which the images are stored, is hereinafter referred to as an image storage unit 142, and a storage area of the memory 140, in which pieces of information associated with target tracking are stored, is hereinafter referred to as a tracking information storage unit 144.

On the other hand, the remote active camera 100 according to the embodiment of the present disclosure includes the tracking unit 150 that detects a target that corresponds to the received target designation information 260. On the other hand, in a case where the target designation information 260 is received from the remote control apparatus 200, the transfer delay occurs. Therefore, a difference occurs between a point in time at which a target is designated from an image and a point in time at which the current image is acquired in the remote active camera 100.

In this case, due to the transmission delay, the designated target is not included in the currently-acquired image. Therefore, according to the present disclosure, a target of which the tracking is previously completed, that is, a target that is present before the target designation is made, is set as a reference (this target is hereinafter referred to as a reference target). Then, a position of a designation target is estimated on the basis of a position of the reference target, and thus the gimbal of the camera is controlled, until before the transmission delay is compensated for. As a result, the transmission delay is compensated for.

To this end, the tracking unit 150 according to the present disclosure includes a first tracking unit 152 that detects the position of the reference target from the currently-acquired image, and a second tracking unit 154 that detects a position of a target that corresponds to target coordinates (pixel coordinates) of the target designation information 260, that is, a position of the designation target, from images that are acquired during a duration from a point in time that corresponds to the image identification information in the target designation information 260 to a point in time at which the current image is acquired. Then, the delay compensation unit 160 is included that calculates an estimation value of a designation target position with respect to the currently-acquired image on the basis of the position of the reference target and the position of the designation target that are detected from the first tracking unit 152 and the second tracking unit 154, respectively.

The weighing value generation unit 170 calculates a weighting factor in accordance with an estimation position of the designation target, which is calculated in the delay compensation unit 160. The weighting factor is a weighting factor that is applied for directional control for the gimbal, and serves to prevent excessive motion from occurring on a camera due to the gimbal control. The weighing value generation unit 170 generates the weighting factor according to a currently-estimated position of a designation target, a displacement estimation value of the center of an image, and a variable of time that increases with time.

On the other hand, the controller 110 controls overall operation of the remote active camera 100 according to the embodiment of the present disclosure. The controller 110 controls the image capture unit 130 according to the control signal that is received through the communication unit 120 and thus acquires an image. Then, the controller 110 stores the acquired image and transmits the stored image to the remote control apparatus 200. Then, when the target designation information 260 is received, the position of the reference target is detected from a recently-acquired image (a currently-acquired image) by controlling the first tracking unit 152 and the second tracking unit 154, and the position of the designation target, which is detected from the recently-acquired images is detected from the image that corresponds to the image identification information in the target designation information 260. Then, the estimation position of the designation target with respect to the currently-acquired image is calculated from positions of the reference target and the designation target, which are detected by controlling the delay compensation unit 160.

On the other hand, the controller 110 calculates the weighting factor in accordance with the estimation position calculated from the delay compensation unit 160, by controlling the weighing value generation unit 170. Then, the directional control value in which the calculated weighting factor is reflected is generated. As an example, a directional control value that corresponds to the calculated estimation position of the target is calculated from the estimation position of the designation target. In this case, the weighting factor is reflected in the estimation position of the designation target, and the controller 110 accordingly generates the directional control value on the basis of the position of the designation target, in which the weighting factor is reflected.

The directional control means control that changes a line of bore sight for the image capture unit 130, that is, a direction in which the image sensor a lens of the camera is directed. In addition, the gimbal unit 180 is formed to include multiple actuators or a rotating motor in order to change a direction in which a camera, that is, the image capture unit 130, is directed, and is formed in such a manner that it is possibly driven along three axes through the multiple actuators and the rotating motor. Therefore, the controller 110 reflects the weighting factor generated in the weighing value generation unit 170, in the estimation position of the designation target, which is calculated in the delay compensation unit 160, and, by controlling the gimbal unit 180, performs the directional control on the basis of the estimation position of designation target, in which the weighting factor is reflected.

On the other hand, the remote active camera 100 compresses the acquired image and transmits the compressed (coded) image to the remote control apparatus 200 over a downlink channel in a limited bandwidth. Then, the remote control apparatus 200 reproduces the received compressed image, designates a target according to input from an operator, and transmits the target designation information 260 including an identification number of an image from which the target is designated and pixel coordinates of the target, to the remote active camera 100. To this end, the remote control apparatus 200 is configured to include a reproduction unit 202 for decoding and reproducing the compressed image and the input unit 204 for receiving the input from the operator.

Figure 2:
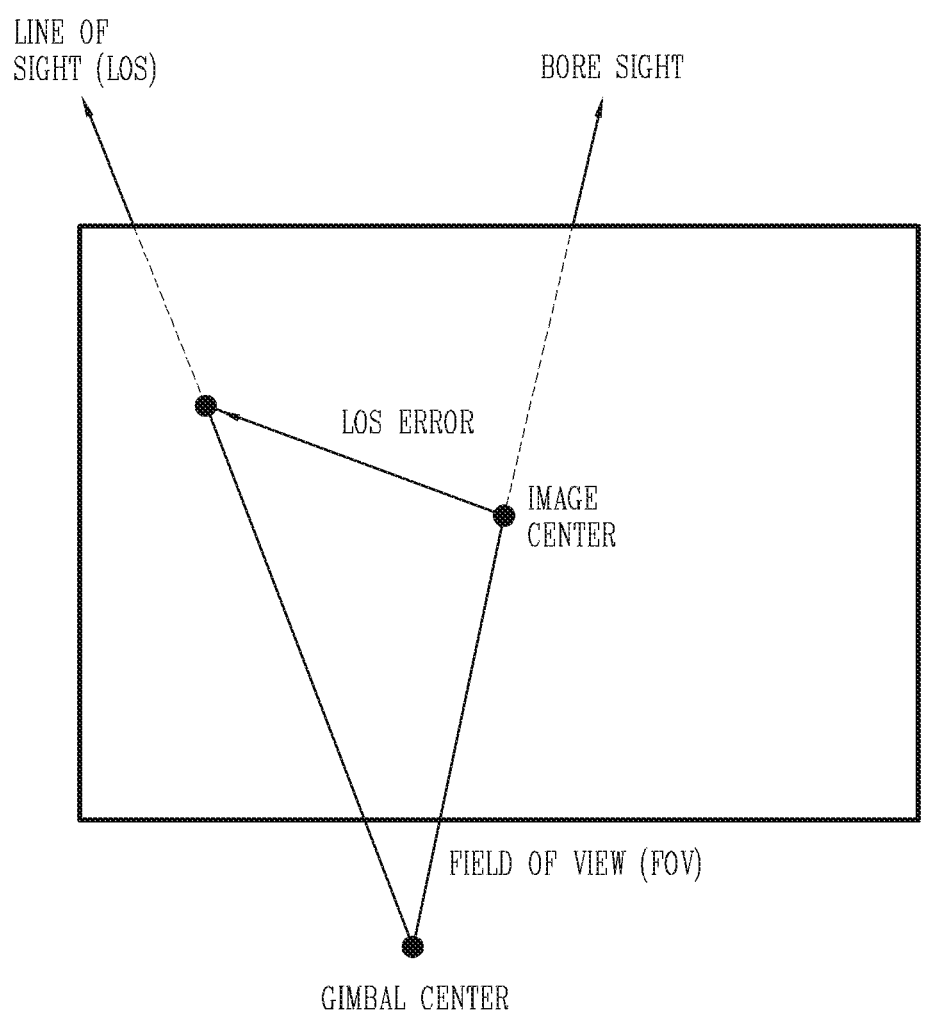
FIG. 2 is a conceptual diagram illustrating a relationship among a line of sight, a line of bore sight, and a field of view, which are defined in the remote active camera.

FIG. 2 is a conceptual diagram illustrating a relationship among a line of sight, a line of bore sight, and a field of view, which are defined in the remote active camera 100.

FIG. 2 illustrates the relationship among the line of sight, the line of bore sight, and the field of view, which are defined in the remote active camera 100, that is, a relationship with respect to the acquisition image. As illustrated in FIG. 2, the field of view is formed with the line of bore sight in the center, and a position at which the line of sight and the field of view are tangent to each other is a target position. Therefore, a distance between the center of an image and the target position is defined as a line-of-sight error.

Figure 3:
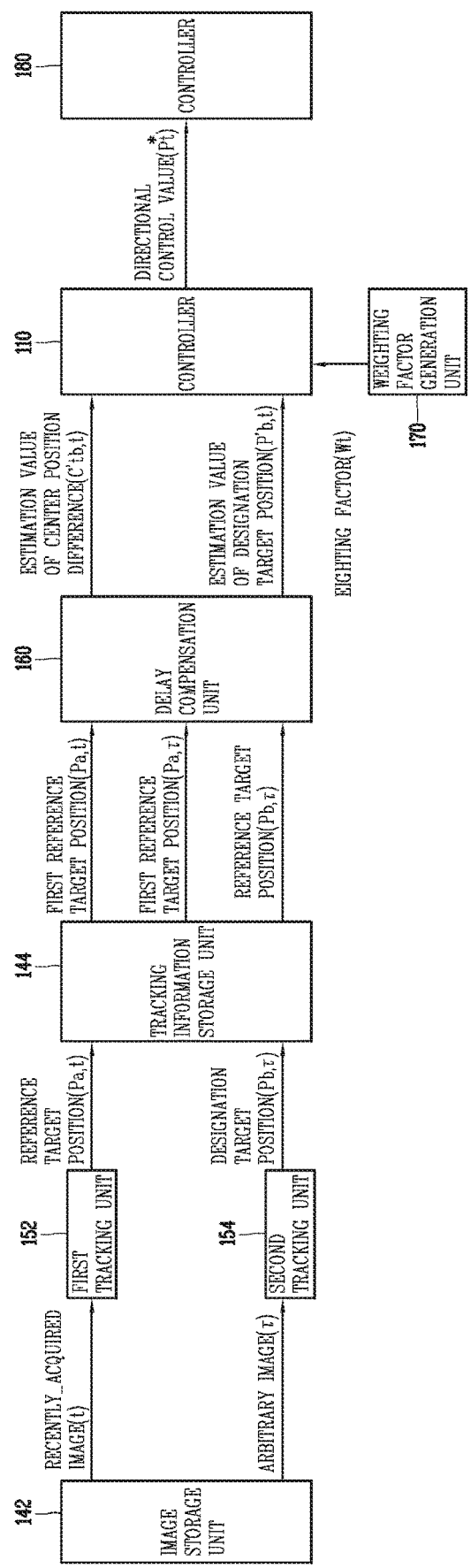
FIG. 3 is a conceptual diagram illustrating a flow for performing gimbal according to a result of tracking a target in the remote active camera according to the embodiment of the present disclosure.

FIG. 3 is a conceptual diagram illustrating a flow for performing gimbal control according to a result of tracking a target in the remote active camera 100 according to the embodiment of the present disclosure. First, variables are described as follows with reference to FIG. 3.

a: Identification number of a target that is tracked before receiving new tracking initialization information from the RCU b: Identification number of a target in accordance with tracking initialization information t: Identification information of a recently-acquired image $t_b$: 1 at a point in time at which designation information on target b is received $\tau_b$: Identification of an image from which a target is designated by the operator $I_x$: Two-dimensional matrix for Image x $P_{z,x}$: Position of target z on image x $C_{x,y}$: Position on Image y, to which the central position of Image x corresponds $g_x$: Line of bore sight at point in time at which $I_x$ is acquired $s_z$: Line of sight (LOS) for Target z (x and y are identification numbers of arbitrary images and z is an arbitrary target)

With reference to FIG. 3, among images acquired through the image capture unit 130, a column of images acquired for a recent fixed period of time are stored in the memory 140. Among these images, $I_t$ (a two-dimensional matrix for a currently-acquired image) and $I_\tau$ (a two-dimensional matrix of an image at an arbitrary point in time ($\tau$)) are loaded by the first tracking unit 152 and the second tracking unit 154, respectively, and $P_{a,t}$ (the position of the reference target on the currently-acquired image) and $P_{b,\tau}$ (the designation target position on an image at the arbitrary point in time ($\tau$)) are detected for storing in the memory 140. Then, $C'_{t_b,t}$ and $P'_{b,t}$ which are estimated values of $C_{t_b,t}$ (a position of the currently-acquired image, which corresponds to a central position of an image at a point in time at which the designation target is received) and $P_{b,t}$ (a position of the designation target on the currently-acquired image), respectively, are obtained using $P_{a,t}$, $P_{a,\tau}$ (a reference target position on an image at the arbitrary point in time ($\tau$)), and P that are stored in the memory 140 for delay compensation, and $P^*_t$ that is a seamless line of sight for deriving a stable gimbal directional-control is obtained by adding up these two values. Then, the gimbal unit 180 is controlled on the basis of $P^*_t$ that is obtained. Thus, the directional control in accordance with the estimated position of the designation target is performed.

Figure 4:
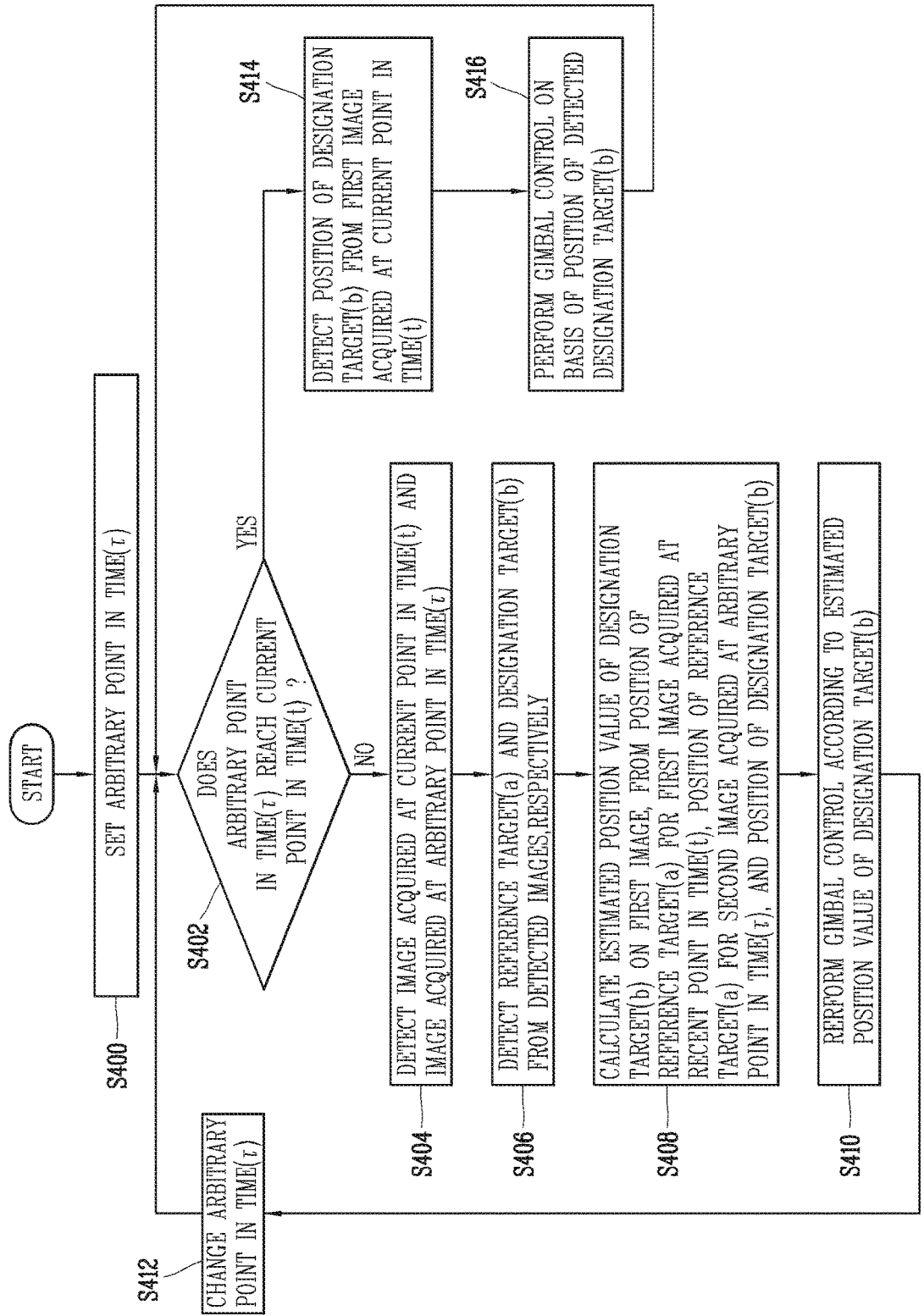
FIG. 4 is a flowchart illustrating an operating process of tracking a target, controlling a gimbal according to the tracked target, and thus controlling a direction in which the remote active camera is directed.

On the other hand, in a case where target designation information for target setting is received from the remote control apparatus 200, the remote active camera 100 according to the embodiment of the present disclosure tracks a target in accordance with the received target designation information, and controls the gimbal according to the tracked target and thus, controls a direction in which the camera is directed. FIG. 4 is a flowchart illustrating a process of operating the remote active camera 100 according to the embodiment of the present disclosure in this case, that is, in a case where the target designation information is received.

First, the controller 110 of the remote active camera 100 according to the embodiment of the present disclosure performs the operating processing, which is illustrated in FIG. 4, in a case where the target designation information is received from the remote control apparatus 200. In a case where the operator sets a designation target (b) through an image that is captured in the remote active camera 100, the target designation information includes an identification number of an image on which the designation target (b) is set to be, and information on coordinates (pixel coordinates) of a pixel that corresponds to the designation target (b) that is set to be on the image.

With reference to FIG. 4, in a case where the target designation information is received, the controller 110 of the remote active camera 100 sets the arbitrary point in time ($\tau$) on the basis of the received target designation information (S400). The arbitrary point in time ($\tau$) here is a point in time that falls between a point in time at which an image that corresponds to an image identification number included in the target designation information, that is, an image from which the designation target (b) is designated is acquired and a point in time at which the current image is acquired. That is, the arbitrary point in time ($\tau$) means a point in time that falls between a point in time at which an image from which the designation target (b) is designated is acquired and a point in time at which the latest (current) image is acquired. At this point, the latest point in time, that is, a point in time at which the current image is acquired is the latest of points in time at which the images are stored in the memory 140, and is a point in time at which an image corresponding to an identification number with the greatest value, of the stored images is acquired. That is, the currently-acquired image is an image with the greatest identification number, of the images stored in the memory 140.

In addition, images that are acquired in each remote active camera 100 correspond to points in time, respectively, at which the images are acquired. Therefore, the arbitrary point in time (τ) means a number of an image acquired at the arbitrary point in time (τ), that is, an identification number of the image acquired at the arbitrary point in time (τ). On the other hand, an identification number of each image gradually increases with time. Accordingly, the later an image is acquired, the greater identification number the image has.

On the other hand, the controller 110 makes a change to the arbitrary point in time (τ) in order to compensate for an error between a point in time at which an image from which the designation target (b) is designated is acquired, and the point in time at which the current image is acquired. In this manner, the arbitrary point in time (τ) that changes between a point in time ($\tau_b$) at which the image from which the designation target (b) is designated is acquired and a point in time at which the latest (current) image is acquired is expressed as in Equation 1 that follows.

$$\tau = \begin{cases} \tau_b & t = t_b \\ \min(t, \hat{\tau} + N) & t > t_b \end{cases} \quad \text{Equation 1}$$

where τ is an identification number of an image corresponding to an immediately-preceding arbitrary point in time (τ) and N is an integer that is greater than 1. In Equation 1, t is the point in time at which the current image is acquired and means an identification number of the currently-acquired image. Then, $t_b$ means a point in time at which the remote active camera 100 acquires an image, when the target designation information is received, that is, an identification number of an image that is acquired, when the target designation information is received.

In addition, t increases by an increment of 1 with time. Therefore, τ is an identification number of an image that corresponds to the arbitrary point in time (τ), when an identification number of the latest-acquired image is t−1.

On the other hand, in a case where the number of images that are acquired in the image capture unit 130 sequentially increases by an increment of 1 according to a time sequence, N is an integer that is greater than 1. Therefore, an identification number (τ) of an image that corresponds to an arbitrary point in time increases faster than t that increases by an increment of 1 with time. Accordingly, at any point in time, an identification number (τ) of an image corresponding to an arbitrary point in time reaches the identification number (t) of the currently-acquired image. At this time, if the identification number (τ) of the image corresponding to the arbitrary point in time reaches the identification number (t) of the currently-acquired image, the identification number t of the currently-acquired image is defined as $T_b$.

On the other hand, in a case where, in Step S400, an arbitrary point in time (τ), that is, the identification number (τ) of the image corresponding to the arbitrary point in time is set, according to Equation 1, the controller 110 sets an identification number ($\tau_b$) of an image at a point in time at which the designation target (b) is designated, as the identification number (τ) of the image corresponding to the arbitrary point in time.

On the other hand, the controller 110 checks whether or not an identification number (τ) of an image at a currently-set arbitrary point in time reaches the identification number (t) of the currently-acquired image (S402).

On the other hand, as a result of the checking in Step S402, in a case where the identification number (τ) of the image at the arbitrary point in time does not reach the identification number (t) of the currently-acquired image, that is, in a case where the identification number (τ) of the image at the arbitrary point in time is smaller than the identification number (t) of the currently-acquired image, the controller 110 detects a first image corresponding to the identification number (t) of the currently-acquired image and a second image corresponding to the identification number (τ) of the image at the arbitrary point in time from the memory 140 (S404).

At this point, in a case where, in Step S400, the identification number (τ) of the image at the arbitrary point in time is set and then a change is not made to it, the identification number (τ) of the image at the arbitrary point in time is the identification number ($\tau_b$) of the image at the point in time at which the designation target (b) is designated.

On the other hand, in order to compensate for a difference between a point in time at which a target is designated from an image and a point in time at which the current image is acquired, the remote active camera 100 according to the present disclosure detects a position of a reference target (a) and, on the basis of the detected position of the reference target (a), calculates an estimation position of the designation target (b) from the currently-acquired image. To this end, the controller 110 performs detection of the reference target (a) and the designation target (b) on each of the images detected in Step S404, that is, the image corresponding to the arbitrary point in time (the image corresponding to the identification number (τ) (the first image) and the currently-acquired image (the image corresponding to the identification number (t) (the second image) (S406). The reference target (a) here is a target of which the tracking is completed before the reference target (b) is designated.

On the other hand, in Step S406, the controller 110 detects the position $P_{a,t}$ of the reference target (a) from the first image. Then, a position ($P_{a,\tau}$) of the reference target (a) and a position ($P_{b,\tau}$) of the designation target (b) are detected from the second image. In this manner, in order to detect a position of each of the targets (the reference target and the designation target) in two different images at the same time, the remote active camera 100 according to the embodiment of the present disclosure includes two tracking units, the first tracking unit 152 and the second tracking unit 154. The first tracking unit 152 that detects a position of a target from the first image and the second tracking unit 154 that detects a position of a target from the second image are operated in parallel at the same time.

Then, the controller 110 detects a position estimation value ($P'_{b,t}$) of a designation target (b) on the first image on the basis of a reference target position ($P_{a,t}$) for the first image, a reference target position ($P_{a,\tau}$) for the second image, and a position ($P_{b,\tau}$) of the designation target (b), which are detected (S408).

In addition, in Step S408, the controller 110 calculates an estimation value ($C'_{t_b,t}$) of a position to which the center of an image ($t_b$) acquired at a point in time at which the designation target (b) is designated is moved from the currently-acquired image (t), on the basis of the position ($P_{a,t}$) of the reference target (α) on the currently-acquired image (t), that is, the first image, and the position ($P_{a,t_b}$) of the reference target (L) on the image ($t_b$) acquired at a point in time at which the designation target (b) is designated.

Figure 5:
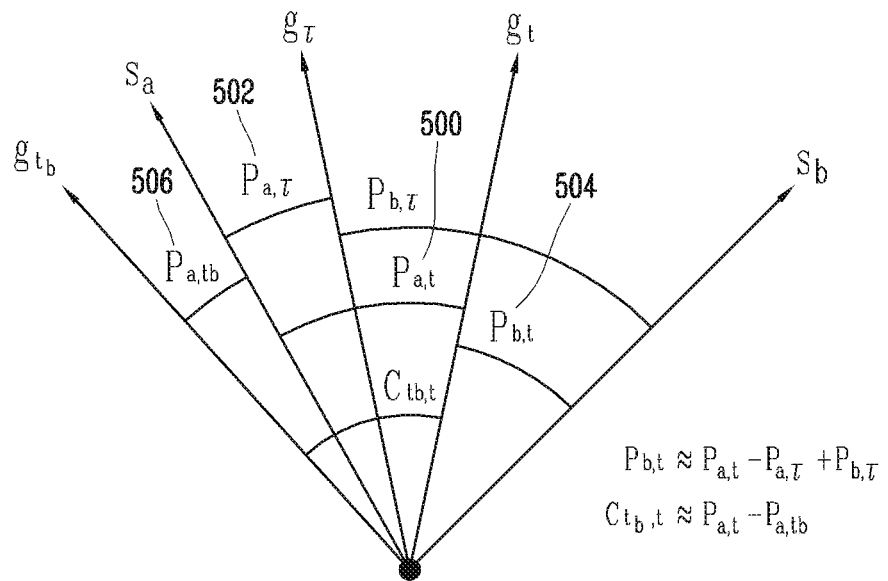
FIG. 5 is a conceptual diagram illustrating a concept of estimating a position of a designation target on the basis of positions estimated in Step S408 in the operation process in FIG. 4.

FIG. 5 is a conceptual diagram illustrating a concept of estimating the position of the designation target on the basis of the positions estimated in Step S408 in an operating process in FIG. 4.

For convenience in description, it is assumed that a position of the remote active camera 100 and positions of a and b are fixed on an inertial coordinate system.

In this case, in FIG. 5, as described with reference to FIG. 2, $g_x$, as a normal line vector of $I_x$, passes through the center of $I_x$. In addition, $s_z$ passes through $P_{z,x}$ that is a position of target z within $I_x$. On the other hand, as illustrated in FIG. 5, a result $P_{b,t}$ of tracking the designation target (b) is not present on an image (t) that is acquired at a current point in time, and $C_{t_b,t}$ cannot also be obtained directly. Therefore, estimated values ($P'_{b,t}$ and $C'_{t_b,t}$) of two values ($P_{b,t}$ and $C_{t_b,t}$) are each calculated from values ($P_{a,t}$: 500, $P_{a,\tau}$: 504, and $P_{b,\tau}$: 506) that result from obtaining $P_{b,t}$ through the tracking unit, using Equation 2 that follows.

$$P'_{b,t} = P_{a,t} - P_{a,\tau} + P_{b,\tau} \quad t < T_b$$
$$C'_{t_b,t} = P_{a,t} - P_{a,t_b} \quad t < T_b$$

Equation 2 wherein $P_{a,t}$ denotes a position of a reference target (a) on the first image, $P_{a,\tau}$ denotes a position of a reference target (a) on the second image, $P_{b,\tau}$ denotes a position of a designation target (b) on the second image, and $P_{a,t_b}$ denotes a position of a reference target (A) on an image ($t_b$) acquired at a time at which the designation target (b) is acquired.

Then, the controller 110 generates the directional control value for controlling the gimbal unit 180 on the basis of the position estimation value ($P'_{b,t}$) of the designation target (b) calculated in Step S408 and the estimation value ($C'_{t_b,t}$) of the position to which the center of the image ($t_b$) acquired at a point in time at which the designation target (b) is designated is moved from the currently-acquired image (t). Furthermore, the controller 110 controls the gimbal unit 180 on the basis of the generated directional control value, and thus performs the directional control in such a manner that a line of bore sight for an image that is captured is moved to a position corresponding to the position estimation value ($P'_{b,t}$) of the designation target (b).

Then, the controller 110 changes the currently-set arbitrary point in time (τ) according to Equation 1 (S412). In Step S412, according to Equation 1, the controller 110 adds an integer N that is greater than 1 that is preset, to the identification number of the image according to the currently-set arbitrary point in time (τ) and thus sets an identification number of an image corresponding to a new arbitrary point in time (τ).

Then, the controller 110 precedes to Step S402 and compares the identification number corresponding to the arbitrary point in time (τ) that is set in Step S412 and the identification number (t) of the currently-acquired image. Then, in a case where the identification number (τ) of the image corresponding to the arbitrary point in time that is set in Step S412 is smaller than the identification number (t) of the currently-acquired image, the controller 110 repeatedly performs Steps S404 to S412. Then, an identification number (τ) of an image corresponding to a new arbitrary point in time that is reset in Step S412 and the identification number (t) of the currently-acquired image are again compared.

On the other hand, as a result of the checking in Step S402, in a case where an identification number (τ) of an image corresponding to a currently-set arbitrary point in time reaches the identification number (t) of the currently-acquired image, the identification number t of the currently-acquired image is defined as $T_b$. Then, the position ($P_{b,t}$) of the designation target (b) is detected from the image (the first image) acquired at the current point in time (S414). Then, the directional control value is generated on the basis of the position ($P_{b,t}$) of the detected designation target (b) and the gimbal unit 180 is controlled on the basis of the generated directional control value. Thus, the directional control is performed in such a manner that the center point of the image that is captured is moved to the position corresponding to a position value ($P_{b,t}$) of the designation target (b) (S416). This is because the designation target (b) is immediately detected from the image that is acquired, on and after point in time $T_b$. Accordingly, the controller 110 drives only the first tracking unit 152 that detects a target from the first image and thus performs the directional control through the control of the gimbal unit 180.

Figure 6:
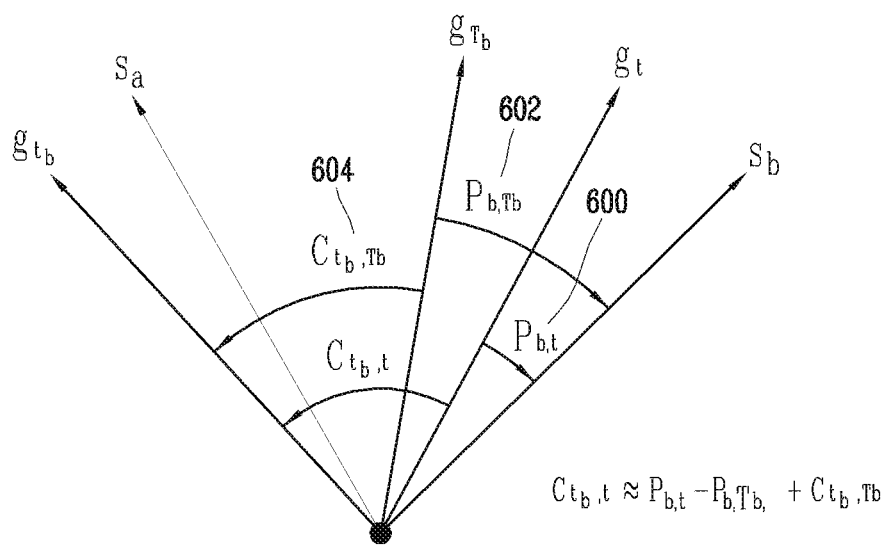
FIG. 6 is a flowchart illustrating a concept of calculating replacement of the center of an image in order to calculate a weighting factor for calculating gimbal, from a currently-acquired image in the remote active camera according to the embodiment of the present disclosure.

FIG. 6 is a conceptual diagram illustrating a concept of estimating the position of the designation target on the basis of the positions estimated in Step S416 in the operating process in FIG. 4.

As illustrated in FIG. 6, position (coordinates) $P_{b,t}$ of the designation target (b) is acquired immediately from the first image on and after point in time $T_b$.

On the other hand, because the reference target (a) is no longer tracked on and after point in time $T_b$, as illustrated in FIG. 5, there is a problem in that estimation value $C_{t_b,t}$ of the position to which the center of the image is moved cannot be estimated. Accordingly, as illustrated in FIG. 6, $C_{t_b,t}$ is obtained using the position (the coordinates) of the designation target (b). In FIG. 6, on the image that results when t is $T_b$, that is, at a point in time ($T_b$) when the identification number (τ) of the image corresponding to the arbitrary point in time reaches the identification number (t) of the currently-acquired image, $C_{t_b,T_b}$ means the position corresponding to the center of the image ($t_b$) acquired at a point in time at which the designation target (b) is designated.

On the other hand, a position (coordinates) estimation value $P'_{b,t}$ of the designation target (b) on and after point in time $T_b$ and estimation value $C'_{t_b,t}$ of the position to which the center of the image is moved are calculated as in Equation 3 that follows.

$$P'_{b,t} = P_{b,t} \quad t \geq T_b$$
$$C'_{t_b,t} = P_{b,t} - P_{b,T_b} + C_{t_b,T_b} \quad t \geq T_b$$

Equation 3 where, $P_{b,t}$ denotes the position of the designation target (b) on the first image, $P_{b,T_b}$ denotes the position of the designation target (b) on the image ($T_b$) at a point in time when the identification number (τ) of the image corresponding to the arbitrary point in time reaches the identification number (t) of the currently-acquired image, and $C_{t_b,T_b}$ denotes the position value that corresponds to the center of the image ($t_b$) acquired at a point in a time at which the designation target (b) is designated, on the image at a point in time ($T_b$) when the identification number (τ) of the image corresponding to the arbitrary point in time reaches the identification number (t) of the currently-acquired image.

On the other hand, in Equation 3, when point in time t is $T_b$, the arbitrary point in time (τ) is $T_b$, and therefore $P'_{b,t}=P_{b,t}$. Therefore, the coordinates of the designation target ($T_b$) on the image corresponding to the point in time ($T_b$) are connected seamlessly. In addition, when t is $T_b$, $C_{t_b,T_b}$ is the same as in Equation 3. Because of this, in Equation 2 and Equation 3, $C_{t_b,t}$ and $C_{t_b,T_b}$ are connected seamlessly.

On the other hand, $C'_{t_b,t}$ in Equation 2 is T≤$T_b$, and $C'_{t_b,t}$ in Equation 3 is t<$T_b$. This is because if $T_b$ is substituted for t in $C'_{t_b,t}$ in Equation 3, SYM. Therefore, when t is $T_t$ is $T_b$, $C'_{t_b,t}$ in Equations 2 and 3 may be calculated as follows, in such a manner that the reference target (a) is not tracked to calculate $C'_{t_b,t}$ in Equation 2.

$$C'_{t_b,t} = \begin{cases} P_{a,t} - P_{a,t_b} & t \leq T_b \\ P_{b,t} - P_{b,T_b} + C'_{t_b,T_b} & t > T_b \end{cases}$$

On the other hand, in Equation 2, when is $T_b$, if the controller 110 stores $P_{a,t}$, $P_{a,t_b}$ does not change thereafter. Therefore, in a case where t is greater than $T_b$, it is also possible that $P_{a,t_b}$ continues to be used. Likewise, in Equation 3, when t is $T_b$, $P_{b,T_b} = P_{b,t}$, and $C_{t_b,T_b} = C_{t_b,t}$. Therefore, when t is $T_b$, $P_{b,T_b} + C_{t_b,T_b}$ is calculated and the calculated value is stored. When this is done, $C_{t_b,t}$ when t is greater than $T_b$ is easily calculated by subtracting the calculated value from $P_{b,t}$.

On the other hand, in a case where the identification number (τ) of the image corresponding to the arbitrary point in time reaches the identification number (t) of the currently-acquired image, that is, in a case where $τ=t=T_b$, the controller 110 determines that a delay error due to the reception of the target designation information is compensated for. Therefore, the controller 110 repeatedly performs Steps S414 and S416 until before new target designation information is received, the position of the designation target (b) that is detected from the first image is obtained from Equation 3, and the directional control value is generated according to the detected position. Then, the gimbal unit 180 is controlled according to the generated directional control value, and thus the directional control is performed.

However, in a case where target designation information on a new designation target c is received, the controller 110 sets a position of a current designation target (b) as a reference target, and performs the tracking of and the directional control of the new designation target c through the process in FIG. 4.

On the other hand, in a case where the identification number (τ) of the image corresponding to the arbitrary point in time does not reach the identification number (t) of the currently-acquired image (τ<t or t<$T_b$), the remote active camera 100 according to the embodiment of the present disclosure moves the line of bore sight for the image that is captured on the basis of an estimated position value ($P'_{b,t}$) of the designation target. In this case, if a speed at which the line of bore sight moves is too high, motion of the gimbal unit 180 is too fast.

Therefore, an image is greatly shaken. Thus, there is a likelihood that image tracking will fail due to this.

Figure 7A:
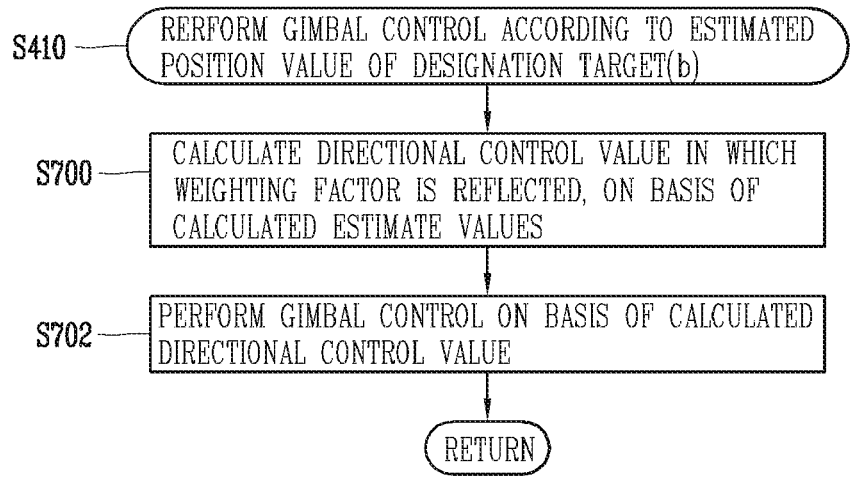
FIG. 7A is a flowchart illustrating an operating process of controlling a gimbal according to the weighting factor calculated on the basis of estimated values of the position of the target in the remote active camera according to the embodiment of the present disclosure.

Therefore, the remote active camera 100 according to the embodiment forms an interpolated imaginary line of bore sight and thus adjusts a direction speed for the line of bore sight. FIG. 7A is a flowchart illustrating an operating process in which, in this case, the gimbal is controlled according to the weighting factor calculated on the basis of estimated values of the position of the target in the remote active camera 100 according to the embodiment of the present disclosure.

With reference to FIG. 7A, the controller 110 of the remote active camera 100 according to the embodiment of the present disclosure calculates a weighting factor on the basis of the positions estimated in Step S408, that is, the position estimation value ($P'_{b,t}$) of the designation target (b) and the estimation value ($C'_{t_b,t}$) of the position to which the center of the image ($t_b$) acquired at a point in time at which the designation target (b) is designated is moved from the currently-acquired image (t), and generates the directional control value in which the weighted faction is reflected (S700).

At this point, in Step S700, the directional value is calculated according to a weighted-sum function as illustrated Equations 4 and 5 that follow.

$$f(u, v, w) = wu + (1-w)v \qquad \text{Equation 4}$$

On the other hand, a value of a variable w of a range [0, 1] increases from 0 to 1. As a result, seamless movement from an arbitrary vector u to vector v is made. Using this weighted-sum function, the directional control value ($P^*_t$) (the estimated position value of the designation target, in which the weighting factor is reflected) in which the weighting factor is reflected as in Equation 5 that follows is generated.

$$P^*_t = f(c'_{t_b,t}, P'_{b,t}, w_t) \qquad \text{Equation 5}$$

The weighting factor $w_t$ here increases with time and is as in Equation 5 that follows.

$$w_t = \begin{cases} \Delta w & t = t_b \\ \min(1, w_{t-1} + \Delta w) & t > t_b \end{cases} \qquad \text{Equation 6}$$

In Equation 6, $w_t$ is a variable having a value between 0 to 1. In Equation 6, a min function is a function that converts the smaller of values of two variables, 1 and $W_{t-1}+\Delta w$, which are input. As a result, if $W_{t-1}+\Delta w$ is greater than 1, 1 is calculated as the weighting factor $w_t$. That is, a value of the weighting factor $w_t$ is limited to 1.

On the other hand, according to Equation 5, if t at the moment when the weight factor $w_t$ for the designation target (b) is 1 is $Ω_b$, when $t≥Ω_b$, $f(c'_{t_b,t},P'_{b,t},w_t)$ is the same as $P_{b,t}$. Therefore, Equation 5 is summarized as Equation 7 that follows.

$$P^*_t = \begin{cases} f(c'_{t_b,t}, P'_{b,t}, w_t) & t < Ω_b \\ P_{b,t} & t \geq Ω_b \end{cases} \qquad \text{Equation 7}$$

where $Ω_b$ is an identification number of an image that is acquired when weighting factor $w_t$ for the designation target (b) is 1, t is a weighting factor that has a value from 0 to 1 and increases with time, $P'_{b,t}$ is a position estimation value of the designation target (b), and $C'_{t_b,t}$ is an estimation value of the position to which the center of the image ($t_b$) acquired at a point in time at which the designation target (b) is designated is moved from the currently-acquired image (t).

That is, from Equation 7, it can be seen that the weighting factor $w_t$ is assigned to the designation target (b) until the weighting factor $w_t$ becomes 1 ($t=Ω_b$) and thus that the directional control is prevented from being excessively performed. It can also be seen that the directional control is performed according to the position of the designation target (b) on and after a point in time when the weighting factor becomes 1 ($t≤Ω_b$).

Figure 7B:
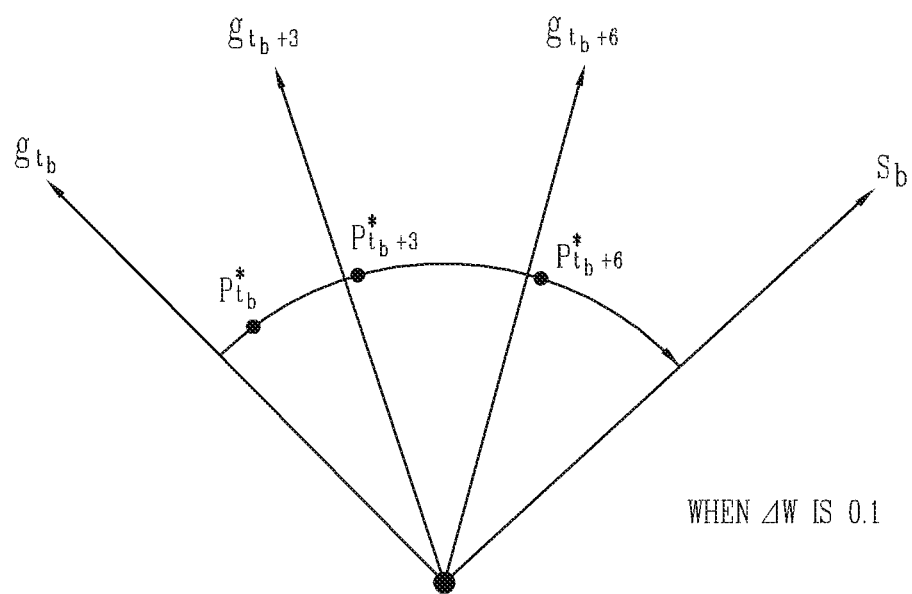
FIG. 7B is a diagram illustrating a directional control value that is calculated in a case where the weight factor calculated in the remote active camera according to the embodiment of the present disclosure is 0.1 and an example of the line of bore sight that follows a line of sight in accordance with the calculated directional control value.

On the other hand, consequently, Equation 7 is the same as Equation 5. However, Equation 7 is meaningful in that, for section t≥Ω$_b$, C'$_{t_b,t}$ does not need to be calculated. In this manner, the weighting fact is increased by as large a value Δw as is pre-defined, and the directional speed is adjusted through suitable setting of the value Δw in such a manner that P*$_t$ is moved from C'$_{t_b,t}$ to P'$_{b,t}$. As in FIG. 7B illustrating a directional control value that is calculated in a case where the weight factor calculated at this time is 0.1 and an example of the line of bore sight that follows a line of sight in accordance with the calculated directional control value, seamless directing is performed by controlling line of bore sight g$_t$ in accordance with the directional control value P*$_t$.

On the other hand, in a state where a target that precedes the designation target (b) is not present, in a case where the directional control in accordance with the target designation is performed on the image (t$_b$) acquired at a point in time at which the designation target (b) is designated, P'$_{b,t}$ for obtaining P*$_t$, as in Equation 7, cannot be obtained according to Equation 2, until the point in time (t) at which the current image (or the identification number of the currently-acquired image) is obtained becomes T$_b$, that is, until the arbitrary point in time (τ) is the point in time (t) at which the current image is obtained.

Therefore, in this case, as in Equation 8, replacement as image center coordinates c may be caused to take place and the directional control may be performed after t is T$_b$. The image center coordinates c here is the center of the image (the image having the greatest identification number, of the images stored in the memory, when the designation target is designated, that is, when the target designation information is received) that is acquired in the remote active camera 100 when the designation target is designated, that is, is a point in time of which coordinates are 0 and 0.

$$P_t^* = \begin{cases} c & t \leq T_b \\ f(c'_{T_b,t}, P_{b,t}, w_t) & T_b < t < \Omega_b \\ P_{b,t} & t \geq \Omega_b \end{cases} \quad \text{Equation 8}$$

where C'$_{t_b,t}$ is P$_{b,t}$−P$_{b,T_b}$

In this case, as illustrated in Equation 9 that follows, the weighting factor increases after when the point in time (t) at which the current image is acquired is longer than T$_b$ (at a point in time at which the arbitrary point in time (τ) is a point in time (t) at which the image is acquired).

$$w_t = \begin{cases} \Delta w & t = T_b \\ \min(1, w_{t-1} + \Delta w) & t > T_b \end{cases} \quad \text{Equation 9}$$

On the other hand, when t is Ω$_b$ in Equations 7 and 8, from FIG. 7B, it can be seen that P*$_t$ is on a line of sight (s$_b$) for passing through a target. Thus, the directional control is ended.

On the other hand, the tracking initialization information is received in an arbitrary situation. As an example, in a case where the target designation information is received, the controller 110 determines that tracking initialization information for tracking a new target is received. In this case, suitable directional control is performed using Equations 7 and 8, under all the following situations.

1) Reception of the tracking initialization information under a situation where directional or staring control of an arbitrary target is not performed 2) Reception of the tracking initialization information under a situation where the directional control of an arbitrary target is performed 3) Reception of the tracking initialization information under a situation where the staring control of an arbitrary target is performed According to the present disclosure, the directional control is initialized to deal with all of these situations. Examples of various cases are described with reference to these initialization processes. For description, it is assumed that targets i, j, and k are present (in the following time sequence: i→j→k).

When the target designation of a target is first made, according to Equation 8, the target i is set as a designation target and directional control is performed. Then, if target designation information for the target j is received at a point in time t$_j$ while performing the directional control to the target i, the directional control to the target j is performed in two cases.

If t$_j$≥T$_j$ (a point in time at which an image identification number at an arbitrary point in time reaches a point in time at which the current image is acquired), a position of the target j is available on an image acquired at the point in time t$_j$, and thus, a state where a reference target is available is retained. Therefore, the targets i and j are set as a reference target and a designation target, respectively, and the directional control is performed according to Equation 7.

On the other hand, if t$_j$<T$_j$, the position of the target j cannot be obtained from the image acquired at the point in time t and thus there occurs a case where the reference target is not present. Therefore, the target j is set as the reference target and the directional control in accordance with Equation 8 is performed.

As still another example, a case is assumed where, while the target i is tracked according to Equation 7, when directing to the target j is performed after the point in time t$_j$, tracking designation information for a target k is received at t$_k$(>t$_j$). At this time, if t$_k$<T$_k$ (the point in time at which an image identification number at an arbitrary point in time reaches the point in time at which the current image is acquired), the position of the target j is available, as the reference target, on the image acquired at the point in time t$_j$, and if t$_k$≥T$_k$, a position of the target k is available, as the reference target, on the image acquired at the point in time t$_k$. In this case, the target k is the designation target, and, according to a situation where the reference target is available, the target i or the target j is set as the reference target. Then, the directional control in accordance with Equation 7 is performed.

Figure 8:
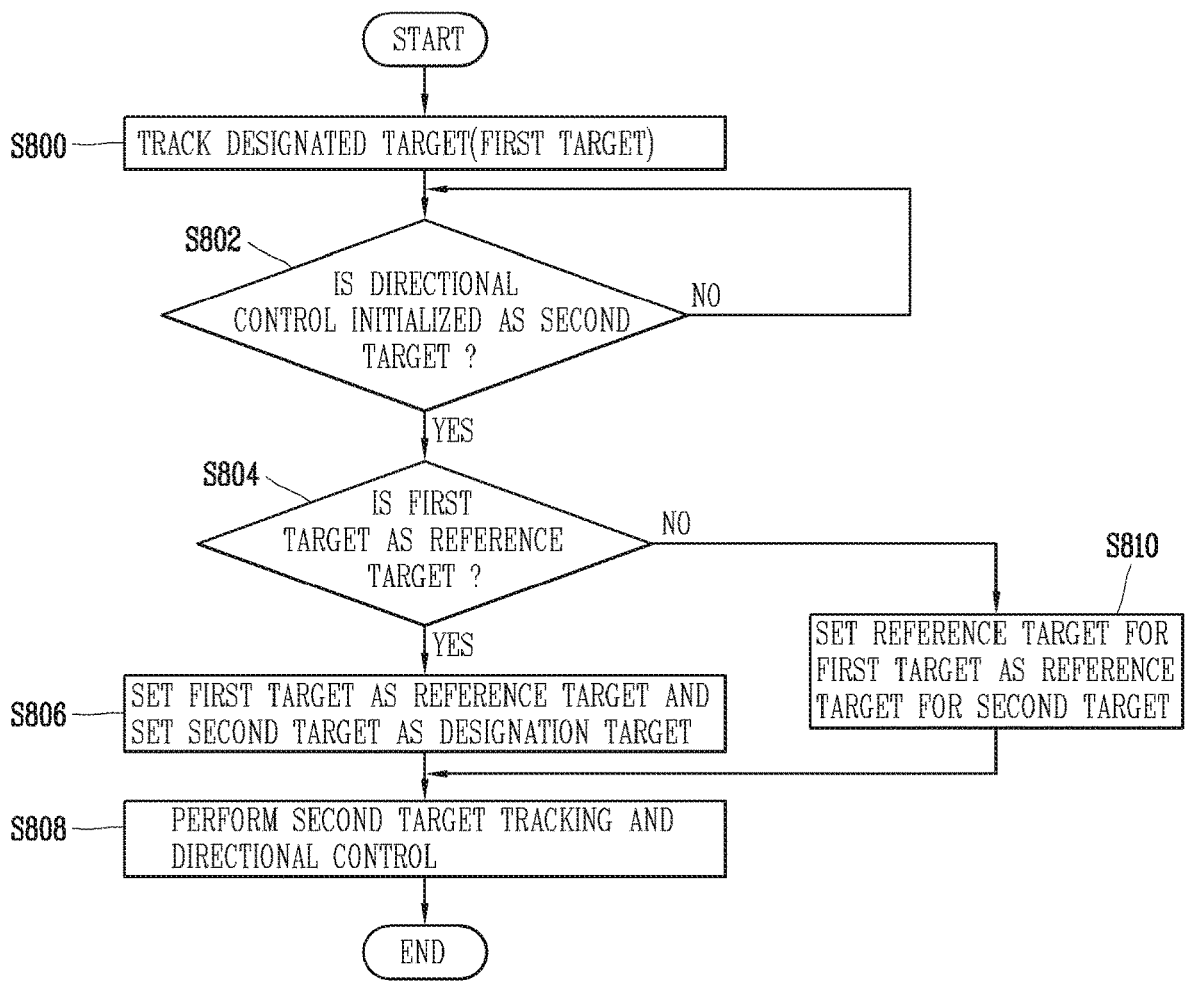
FIG. 8 is a flowchart illustrating an operating process of setting a reference target when an operator designates a target in the remote active camera according to the embodiment of the present disclosure.

FIG. 8 is a flowchart illustrating an operating process of setting the reference target when a target is designated in this manner.

With reference to FIG. 8, in a case where the target designation information is received, the remote active camera 100 according to the embodiment of the present disclosure tracks a target in accordance with the received target designation information (S800). In this case, the controller 110 sets an image identification number at an arbitrary point in time with reference to FIG. 4, and increases the image identification number at the arbitrary point in time until the image identification number is the same as an identification number of a currently-acquired image. While this is done, the controller 110 performs tracking of a first target (detection of a position of the first target and directional control in accordance with the detected position) in accordance with the target designation information.

In this state, the controller 110 determines whether or not the directional control is initialized (S802). At this point, the initialization of the directional control is performed in a case where a new target is set. That is, in a case where a second target, which is different from the first target, is set, the controller 110 initializes the directional control. At this point, the second target is set in a case where target designation information for the second target is received from the remote control apparatus 200.

As a result of the determination in Step S802, in a case where the directional control is not initialized for the second target, the controller 110 maintains a state where the first target is tracked, without any change. However, in a case where the directional control is initialized for the 2-second target, the controller 110 determines whether or not the first target that is currently being tracked is available as the reference target (S804).

As an example, the controller 110 determines whether or not the first target is available as the reference target, depending on whether or not the tracking of the first target is possible only with an image that is currently obtained. That is, in a case where an image identification number at an arbitrary point in time, which gradually increases through Step S412 in FIG. 4, is the same as the identification number of the currently-acquired image, where compensation for a delay error due to the reception of the target designation information is thus completed, and where the tracking of the first target is possible only with the image that is currently acquired, the controller 110 determines that the first target that is currently being tracked is available as the reference target.

On the other hand, in a case where the tracking of the first target is not possible only with the image that is currently acquired, that is, in a case where an image identification number at an arbitrary point in time, which gradually increases through Step S412 in FIG. 4, does not reach the identification number of the currently-acquired image and where a position of a target thus has to be detected both from an image corresponding to an arbitrary point in time and from the currently-acquired image, the controller 110 determines that the first target that is currently being tracked is not available as the reference target.

Alternatively, the controller 110 determines whether or not the first target is available as the reference target, depending on whether or not the tracking of the first target is possible without the reference target. That is, in a case where the tracking of the first target is possible only with the image that is currently being acquired and where the tracking of the first target is thus possible without further need for the reference target, the controller 110 determines that the first target is available as the reference target for the second target.

As a result of the determination in Step S804, in a case where the first target is available as the reference target, the controller 110 sets the first target as the reference target and sets the second target as the designation target (S806). Then, as illustrated in FIG. 4, the registration target (the second target) is tracked using the reference target (the first target), and the directional control is performed on the basis of the directional control value that is calculated according to the tracked position.

On the other hand, as the result of the determination in Step S804, in a case where the first target is not available as the reference target, the controller 110 sets the reference target used for tracing the first target, as the reference target for the second target (S810).

In this case, because there is no track that is previously tracked, if the first target is in a state of being tracked with the center of an image as a reference, a position of the center of the image is set as the reference target for the second target.

Then, the controller 110 sets the second target as the designation targets, proceeds to Step S808, and tracks the second target. Subsequently, the controller 110 performs the directional control on the basis of the directional control value that is calculated according to the tracked position.

Figure 9:
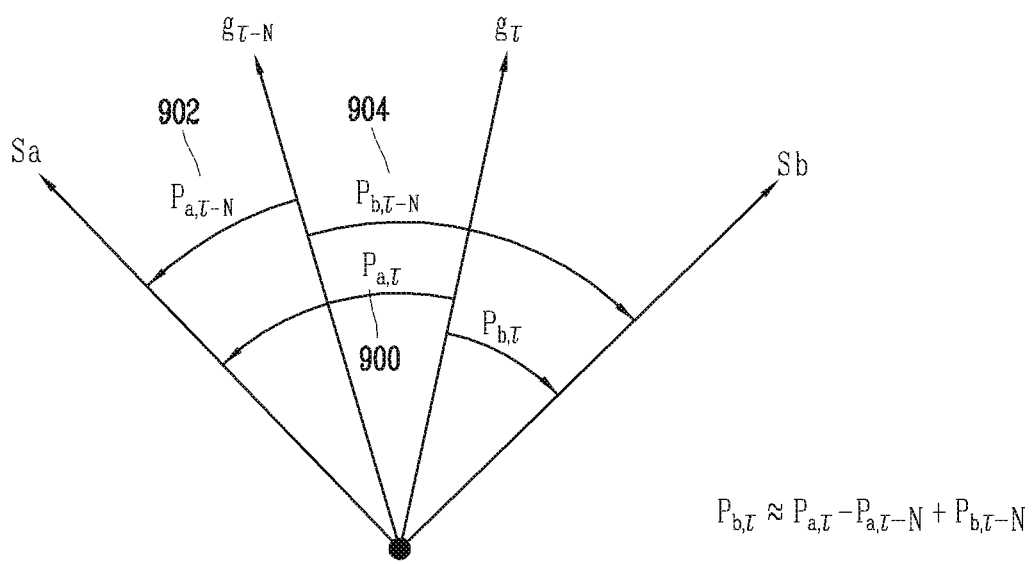
FIG. 9 is a conceptual diagram illustrating a concept of controlling a directional control speed on the basis of a prediction position of the designation target in the remote active camera according to the embodiment of the present disclosure.

FIG. 9 is a conceptual diagram illustrating a concept of controlling a directional control speed on the basis of a prediction position of the designation target in the remote active camera according to the embodiment of the present disclosure.

The remote active camera 100 according to the embodiment of the present disclosure, as expressed in Equation 6, reduces the directional speed through adjustment of the weighting factor, accordingly reduces motion of the camera, and thus tracks a target in a stable manner.

On the other hand, in the remote active camera 100 according to the embodiment of the present disclosure, the first and second tracking units, as illustrated in FIG. 3, perform target tracking on a recently-acquired image (t) and an image ($\tau$) at an arbitrary point in time, respectively, which are acquired, when the directional control is performed as in Equation 7. However, because a value of an identification number of the image ($\tau$) at an arbitrary point in time increases by N that is greater than 1, a tracking unit for the image ($\tau$) at an arbitrary point in time experiences camera motion that is N times as fast. Therefore, the tracking of the designation target fails.

Therefore, as illustrated in FIG. 9, a position of the designation target is predicted in advance using a result associated with the reference target, and then a method of searching the neighborhood of the designation target for a target is considered. That is, as in Equation 10, a prediction value of the position of the designation target on the image ($\tau$) at an arbitrary point in time is obtained.

$$\tilde{p}_{b,\tau} = P_{a,\tau} - P_{a,\tau-N} + P_{b,\tau-N} \qquad \text{Equation 10}$$

Then, the designation target is tracked with $\tilde{p}_{b,\tau}$ on focus and $P_{b,\tau}$ is searched for. At this time, because $P_{b,\tau} = \tilde{p}_{b,\tau}$, although a target search area is not wide, stable tracking is ensured. For Equation 7 in which the reference target is used, this process is applied to a process of obtaining $P_{b,\tau}$ for obtaining $P'_{b,t}$ as in Equation 2.

However, in the case of Equation 8 in which the reference target is not present, this prediction cannot be performed. In this case, $P^*_t$ is set to be c until before target information $P_{b,\tau}$ on the current image is generated, and thus the gimbal is not moved on the inertia coordinate system. Therefore, a prediction method given in Equation 10 for dealing with the motion of the camera is not frequently required.

On the other hand, a number by which the identification number ($\tau$) of the image corresponding to the arbitrary point in time increases, as described above, has a greater value than a number by which the identification number ($\tau$) of the currently-acquired images, which is compared with the identification number ($\tau$) of the image corresponding to the arbitrary point in time each time position value estimation or detection of the designation target in accordance with results of the tracking by the first tracking unit 152 and the second tracking unit 154 is performed, increases.

That is, in a case where the time taken to perform the position value estimation or the detection of the designation target in accordance with the results of the tracking by the first tracking unit 152 and the second tracking unit 154 is the same as the time that it takes for the image capture unit 130 to acquire the image, the identification number (t) of the currently-acquired image, which is compared with the identification number (τ) of the image corresponding to the arbitrary point in time, increases by an increment of 1. In this case, a number N by which the identification number (τ) of the image corresponding to the arbitrary point in time in Equation 1 increases is an integer that is greater than 1.

However, in a case where the time taken to the position value estimation or the detection of the designation target is three times the time that it takes for the image capture unit 130 to acquire the image, the identification number (t) of the currently-acquired image that is compared with the identification number (τ) of the image corresponding to the arbitrary point in time increases by an increment of 3. In this case, the number by which the identification number (τ) of the image corresponding to the arbitrary point in time increases is set to be greater than 3. That is, the number by which the identification number (τ) of the image corresponding to the arbitrary point in time increases has a greater integer value than the number by which the identification number (t) of the currently-acquired image, which is compared with the identification number (τ) of the image corresponding to the arbitrary point in time for the tracking for the position of the designation target (Step S402 in FIG. 4), increases.

On the other hand, as described above, according to the result of the determination in Step S402 in FIG. 4, in a case where the identification number (τ) of the image corresponding to the arbitrary point in time reaches the identification number (τ) of the currently-captured image, only the result of the tracking by the first tracking unit 152 is used. In this case, of course, the controller 110 may interrupt supply of power to the second tracking unit 154 or may cause the second tracking unit 154 to switch to a low power mode or a sleep mode to reduce power consumption.

Advantages of the remote active camera and the method of controlling the remote active camera according to the present disclosure are described as follows.

According to at least one of the embodiments of the present disclosure, a remote active camera autonomously performs target tracking and generates a control signal for the target tracking. Because of this, a gimbal of a camera in accordance with a position of a target can be performed regardless of a delay in communication with a remote control apparatus. In addition, although transmission image information is lost due to a downlink communication error while the remote active camera performs tracking and control, there is an advantage in that continuous target tracking is possible as long as an operator does not change a target.

According to at least one of the embodiments of the present disclosure, a recently-acquired image is stored, tracking of a column of images at a preset interval is performed starting from an image from which a target is designated, and a position of the target is acquired from a currently-acquired image. Because of this, discontinuity of target tracking due to a time delay between an image that is acquired when the target is designated and a recently-acquired image can be reduced. Therefore, in a case where reception of tracking initialization information from an operator is delayed, there is an advantage in that stable tracking of the target is also possible.

According to at least one of the embodiments of the present disclosure, a speed at which a direction in which a camera is directed is changed is adjusted through setting of a weighting factor. Therefore, there is an advantage in that an image resulting from more stable target is provided.

On the other hand, the specific embodiments of the present disclosure are described above, but various modifications to the specific embodiments are possibly implemented without departing from the scope of the present disclosure. However, it is apparent to a person of ordinary skill in the art to which the present disclosure pertains that various alterations and modifications are possible without departing from the nature and gist of the present disclosure. Therefore, the embodiments of the present disclosure are for describing the technical idea of the present disclosure, rather than limiting it, and do not impose any limitation on the scope of the technical idea of the present disclosure. Accordingly, the scope of the present disclosure should be defined by the following claims. All equivalent technical ideas should be interpreted to be included within the scope of the present disclosure.

What is claimed is:

1. A remote active camera comprising:
an image capture unit that captures an image;
a gimbal that changes a direction in which the image capture unit is directed;
a memory in which images having an identification number that increases sequentially according to an acquired time sequence are stored;
a communicator that transmits acquired images to a remote control apparatus and receives target designation information including an image identification number of an image from which a designation target is set and pixel coordinates of the designation target, from the remote control apparatus;
a position tracker that includes a first position tracker which tracks a position of a preset reference target from a first image having a greatest identification number, of the images stored in the memory, and a second position tracker which tracks a position of the designation target from a second image that is one image that is among images between a point in time at which an image corresponds to the image identification number and a point in time at which the first image is acquired; and
a controller coupled to the image capture unit, the gimbal, the communicator, and the position tracker which is coupled to the first position tracker and the second position tracker, the controller configured to:
detect a position of the reference target from the first image and detect a position of the reference target and a position of the designation target from the second image;
compare an identification number of the second image and an identification number of the first image;
estimate a position value of the designation target with respect to the first image or detects the position value of the designation target with respect to the first image, on the basis of a position of the designation target and a position of the reference target, which are tracked from the second image, and a position of the reference target, which is tracked from the first image, according to a result of the comparison; and
control the gimbal in such a manner that a direction in which the image capture unit is directed is changed according to the position value of the designation target, which is estimated or detected,
wherein, in a case where the position value of the designation target with respect to the first image is estimated, the controller causes a weighting factor in accordance with a preset weighted-sum function according to the following equation 4 or 5 to be reflected in the estimated position value, and controls the gimbal nit on the basis of the estimated position value of the designation target, in which the weighting factor is reflected, in such a manner that the speed at which the direction in which the image capture unit is directed is changed is limited, $$f(u,v,w)=wu+(1-w)v \qquad \text{Equation 4}$$

$$P^*_t = f(c'_{t_b,t}, P'_{b,t}, w_t) \qquad \text{Equation 5}$$

where $P^*_t$ is the estimated position value of the designation target, in which the weighting factor is reflected, $C'_{t_b,t}$ is an estimation value of a position to which the center of an image ($t_b$) acquired at a point in time at which the designation target is designated is moved from the first image (t), $P'_{b,t}$ is the estimated position value of the designation target, and $w_t$ is the weighting factor that increases with time.

2. The remote active camera of claim 1,
wherein, when estimating or detecting the position value of the designation target, the controller adds a preset value to the identification number of the second image and detects an image corresponding to the identification number to which the preset value is added, also as the second image, and
wherein the preset value is a value that is greater than a number by which the identification number of the first image, which is compared with the identification number of the second image, increases.

3. The remote active camera of claim 1,
wherein, as a result of comparing the identification number of the second image and the identification number of the first image, in a case where the identification number of the second image is smaller than the identification number of the first image, the controller estimates the position value of the designation target with respect to the first image, on the basis of both a result of the tracking by the first position tracker and a result of the tracking by the second position tracker, and
wherein, in a case where the identification number of the second image is greater than the identification number of the first image, the controller detects the position value of the designation target with respect to the first image from one result of the tracking by the first position tracker.

4. The remote active camera of claim 3,
wherein, in a case where the identification number of the second image is greater than the identification number of the first image, the controller drives the second position tracker in a low power mode.

5. The remote active camera of claim 1,
wherein the weighting factor $w_t$ has a value from 0 to 1.

6. The remote active camera of claim 1,
wherein the reference target is a target that is trackable only with the position value detected from the first image through the first position tracker.

7. The remote active camera of claim 6,
wherein, the reference target is pre-set by the user,
but if the reference target has not been set because the user has not set the reference target when the target designation information is received, the controller sets the center of an image having the greatest identification number, of the images stored in the memory, to be the reference target.

8. The remote active camera of claim 1 is further connected to
a remote control apparatus via the communicator, and
the remote control apparatus that, when the designation target is set with respect to at least one of images that are transmitted from the remote active camera, transmits the image identification number and the pixel coordinates, as the target designation information, and receives an image in accordance with a result of tracking the result of the designation target, as a response to the transmitted target designation information, from the remote active camera.

9. A method of controlling a remote active camera, comprising:
a first step of receiving a target designation including an image identification number of an image from which a designation target is set, and pixel coordinates of the designation target, from a remote control apparatus;
a second step of detecting an arbitrary image between a point in time at which an image corresponding to the image identification number is acquired and a point in time at which a first image having the greatest identification number, of images stored in a memory, is acquired, as a second image;
a third step of comparing an identification number of the second image and an identification number of the first image;
a fourth step of detecting a position of the designation target and a position of a reference target, which are tracked from the second image, and a reference target that is tracked from the first image, when the identification number of the second image is smaller than the identification number of the first image, as a result of the comparison in the third step;
a fifth step of estimating a position value of the designation target with respect to the first image, on the basis of the detected positions;
a sixth step of performing directional control in such a manner that a central position of an image that is captured is changed according to the estimated position value of the designation target;
a seventh step of adding a preset value to the identification number of the second image, detecting an image corresponding to the identification number to which the preset value is added, also as the second image, and detecting the first image having the greatest identification number, of images stored in a memory; and
an eighth step of comparing the identification number of the second image and the identification number of the first image, which are detected in the seventh step, and repeatedly performing the fourth step to the seventh step according to a result of the comparison,
wherein in the sixth step, a weighting factor in accordance with a preset weighted-sum function according to Equation 4 or 5 is caused to be reflected in the estimated position value of the designation target, and the directional control is formed on the basis of the estimated position value of the designation target, in which the weighting factor is reflected, in such a manner that a speed at which the central position is changed is limited, $$f(u,v,w)=wu+(1-w)v \qquad \text{Equation 4}$$

$$P^*_t = f(c'_{t_b,t}, P'_{b,t}, w_t) \qquad \text{Equation 5}$$

where $P^*_t$ is the estimated position value of the designation target, in which the weighting factor is reflected, $C'_{t_b,t}$ is an estimation value of a position to which the center of an image ($t_b$) acquired at a point in time at which the designation target is designated is moved from the first image (t), $P'_{b,t}$ is the estimated position value of the designation target, and $w_t$ is the weighting factor that increases with time.

10. The method of claim 9, wherein the preset value is a value that is greater than a number by which the identification number of the first image increases each time the seventh step is performed.

11. The method of claim 9, wherein the fourth step comprises a (4-1)-th step of detecting a position value of the designation target from the first image in a case where the identification number of the second image is greater than the identification number of the first image, as a result of the comparison in the third step; and a (4-2)-th step of performing directional control in such a manner that a central position of an image that is captured is changed according to the detected position value of the designation target.

12. The remote active camera of claim 9, wherein the weighting factor $w_t$ has a value from 0 to 1.

* * * * *